United States Patent
Li et al.

(10) Patent No.: US 10,948,751 B2
(45) Date of Patent: Mar. 16, 2021

(54) ANTI-PEEP DISPLAY DEVICE AND ANTI-PEEP DISPLAY METHOD

(71) Applicant: BOE TECHNOLOGY GROUP CO., LTD., Beijing (CN)

(72) Inventors: Zhongxiao Li, Beijing (CN); Xiaochuan Chen, Beijing (CN); Wenqing Zhao, Beijing (CN); Ming Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 198 days.

(21) Appl. No.: 16/305,098

(22) PCT Filed: Mar. 6, 2018

(86) PCT No.: PCT/CN2018/078182
§ 371 (c)(1),
(2) Date: Nov. 28, 2018

(87) PCT Pub. No.: WO2018/161904
PCT Pub. Date: Sep. 13, 2018

(65) Prior Publication Data
US 2020/0319490 A1 Oct. 8, 2020

(30) Foreign Application Priority Data

Mar. 7, 2017 (CN) .......................... 201710131734.7

(51) Int. Cl.
*G02F 1/133* (2006.01)
*G02F 1/13* (2006.01)
(Continued)

(52) U.S. Cl.
CPC ........ *G02F 1/13306* (2013.01); *G02F 1/1323* (2013.01); *G02F 1/133504* (2013.01);
(Continued)

(58) Field of Classification Search
CPC ................................................... G02F 1/13306
(Continued)

(56) References Cited

U.S. PATENT DOCUMENTS 7,728,801 B2 6/2010 Tsai et al.
9,846,320 B2 12/2017 Lin et al.
(Continued)

FOREIGN PATENT DOCUMENTS

CN 104090417 A 10/2014
CN 104851394 A 8/2015
(Continued)

OTHER PUBLICATIONS

Search Report and Written Opinion for International Patent Application No. PCT/CN2018/078182 dated May 31, 2018.

*Primary Examiner* — Long D Pham
(74) *Attorney, Agent, or Firm* — Calfee, Halter & Griswold LLP

(57) ABSTRACT

The present disclosure discloses an anti-peep display device and an anti-peep display device. The anti-peep display device includes a display layer and a liquid crystal grating layer; the liquid crystal grating layer is disposed at a surface of the display layer, and the liquid crystal grating layer includes two layers of glass substrate and a liquid crystal layer; these two layers of glass substrate are spaced apart and oppositely disposed; the liquid crystal layer is sandwiched between the two layers of the glass substrate; by adjusting the liquid crystal layer, a plurality of gratings of the liquid crystal grating layer are controlled to switch between black and white, thereby controlling the anti-peep display device to switch between an anti-peep display mode and a shared display mode.

18 Claims, 1 Drawing Sheet

(51) Int. Cl.
*G02F 1/1335* (2006.01)
*G09G 3/36* (2006.01)

(52) U.S. Cl.
CPC ......... *G09G 3/36* (2013.01); *G09G 2300/023* (2013.01); *G09G 2358/00* (2013.01)

(58) Field of Classification Search
USPC .......................................................... 345/4
See application file for complete search history.

(56) References Cited

U.S. PATENT DOCUMENTS

| | | |
|---|---|---|
| 9,927,640 B2 | 3/2018 | Ma |
| 2005/0286000 A1 | 12/2005 | Tsai et al. |
| 2016/0282644 A1 | 9/2016 | Lin et al. |
| 2016/0379394 A1* | 12/2016 | Kim ...................... H04N 13/31 345/629 |
| 2017/0139243 A1 | 5/2017 | Ma |
| 2018/0210243 A1* | 7/2018 | Fang ..................... G02F 1/1334 |

FOREIGN PATENT DOCUMENTS

| | | |
|---|---|---|
| CN | 105954901 A | 9/2016 |
| CN | 106646955 A | 5/2017 |
| EP | 3309774 A1 | 4/2018 |
| JP | 2005265920 A | 9/2005 |
| KR | 20080003072 A | 1/2008 |

* cited by examiner

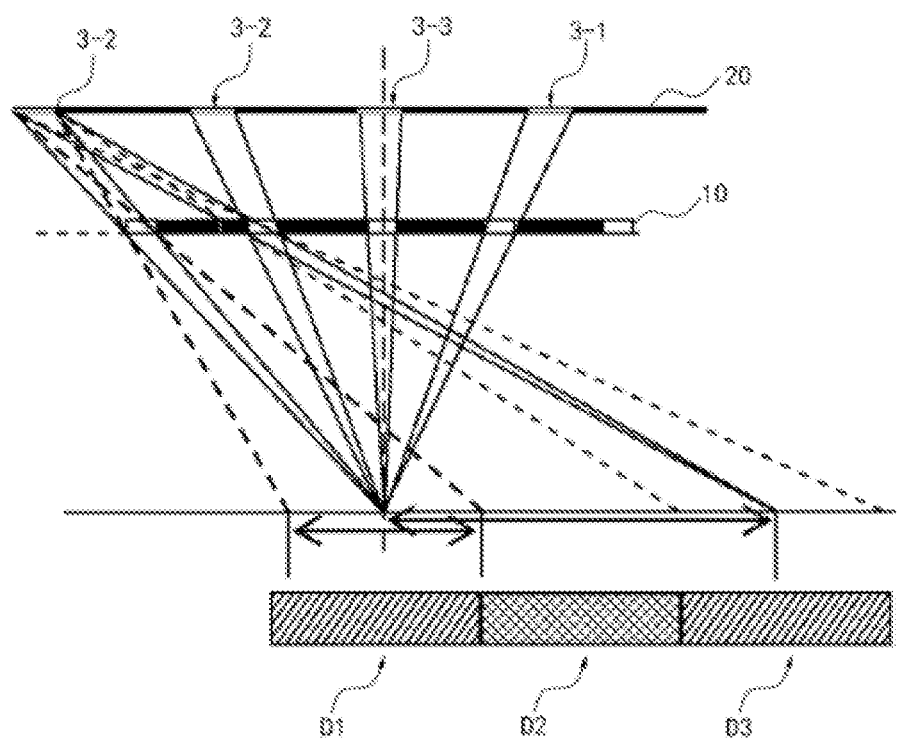

ANTI-PEEP DISPLAY DEVICE AND ANTI-PEEP DISPLAY METHOD

CROSS-REFERENCE TO RELATED APPLICATIONS

The present application is based on and claims priority to International Application No. PCT/CN2018/078182, filed Mar. 6, 2018, which is based on and claims priority to Chinese Application No. 201710131734.7, filed on Mar. 7, 2017, entire contents of which are hereby incorporated by reference.

TECHNICAL FIELD

The present disclosure relates to the technical field of anti-peep display, and in particular, to an anti-peep display device and an anti-peep display method.

BACKGROUND

Liquid crystal display technology has become the mainstream display technology in the market. It has been able to meet requirements of a user in terms of pixel resolution, response time, screen size and many other display technologies. However, in some special display environments, the user may require a special display mode to meet a specific requirement. For example, the user needs the screen to be visible only to himself/herself in an office environment or other private environments, i.e., an anti-peep display mode; but in some cases, this display system needs to be shared with other people, i.e., a shared display mode.

The existing anti-peep display technology is mainly realized by adding a special anti-peep film material, which can only realize an anti-peep display function without a switch between the anti-peep display mode and the shared display mode. In order to realize the switch therebetween, other structures are added onto the existing anti-peep display device based on the above design to realize the switch between the anti-peep display mode and the shared display mode. However, these designs result in a device that is too thick and are also cost prohibitive.

SUMMARY

According to an embodiment of the present disclosure, there is an anti-peep display device, wherein the anti-peep display device includes a display layer and a liquid crystal grating layer; the liquid crystal grating layer is disposed at a surface of the display layer, and the liquid crystal grating layer includes two layers of glass substrate and a liquid crystal layer; these two layers of glass substrate are spaced apart and oppositely disposed; the liquid crystal layer is sandwiched between the two layers of the glass substrate; wherein, by adjusting the liquid crystal layer, a plurality of gratings of the liquid crystal grating layer may be controlled to switch between black and white, thereby controlling the anti-peep display device to switch between an anti-peep display mode and a shared display mode.

According to another embodiment of the present disclosure, there is an anti-peep display method for providing an anti-peep function to a display device, wherein the anti-peep display method includes the following steps of:

providing a liquid crystal grating layer including two glass substrates spaced apart and disposed opposite to each other and a liquid crystal layer sandwiched between the two glass substrates;

arranging the liquid crystal grating layer at a surface of a display layer of the display device; and adjusting the liquid crystal layer to control a plurality of gratings of the liquid crystal grating layer to switch between black and white to adjustably form an anti-peep zone in a visible zone of the display device, so that the display device is controlled to switch between an anti-peep display mode and a shared display mode.

The above and other objects, features and advantages of the present disclosure will become more apparent from the description of preferred embodiments with reference to the accompanying drawings in the following.

BRIEF DESCRIPTION OF THE DRAWINGS

The FIGURE is an optical schematic diagram of an anti-peep display device according to an exemplary embodiment.

DETAILED DESCRIPTION

Example embodiments will now be described more fully with reference to the accompanying drawings. However, the example embodiments can be embodied in a variety of forms, and should not be construed as being limited to the embodiments set forth herein; rather, these embodiments are provided so that this disclosure will be thorough and complete, and the concepts of the example embodiments will be fully given to those skilled in the art. The same reference numerals in the drawings denote the same or similar structures, and thus their detailed descriptions will be omitted.

Embodiment of Anti-Peep Display Device

Referring to the FIGURE, an anti-peep display device capable of embodying the principles of the present disclosure is representatively shown in the FIGURE. In the exemplary embodiment, the anti-peep display device provided by the present disclosure is described by taking an LCD display device as an example. It will be readily understood by those skilled in the art that various modifications, additions, substitutions, deletions, or other variations are made to the specific embodiments described below in order to adapt the design of the anti-peep display device to other types of display devices. These variations are still within the scope of the principles of the anti-peep display device provided by the present disclosure.

As shown in the FIGURE, in the present embodiment, the anti-peep display device provided by the present disclosure mainly includes a display layer 10, a liquid crystal grating layer 20 and a backlight layer. It should be noted that, as shown in the FIGURE, a laminated relationship and an optical path of each main structure of the present disclosure are briefly shown. Apertures on the liquid crystal grating layer 20 respectively represent a red sub-pixel aperture zone 3-1, a green sub-pixel aperture zone 3-2 and a blue sub-pixel aperture zone 3-3 of the display device, i.e., acting as the expression of the sub-pixel color film. The main components of the anti-peep display device provided by the present disclosure will be described in detail below with reference to the above drawing.

As shown in the FIGURE, in the present embodiment, the liquid crystal grating layer 20 is disposed at a surface of the display layer 10, and the display layer is an LCD layer. Specifically, the liquid crystal grating layer 20 includes two glass substrates and a liquid crystal layer. The two glass substrates are spaced apart and disposed opposite to each other, and the liquid crystal layer is sandwiched between the two glass substrates. Based on the above structural design, by adjusting the liquid crystal layer, it is possible to control the plurality of gratings of the liquid crystal grating layer 20 to switch between black and white, thereby controlling the anti-peep function of the anti-peep display device, i.e., controlling the anti-peep display device to switch between an anti-peep display mode and a shared display mode. In addition, in other embodiments, the display layer may also be a self-luminous display layer such as an OLED layer, and the liquid crystal grating layer 20 may be disposed at a surface of the self-luminous display layer (for example, a surface of the light-emitting display layer in a light-emitting direction, i.e., the anti-peep display device provided by the present disclosure is adapted to a self-luminous display device, such as an OLED display device, which will not be described herein.

Preferably, as shown in the FIGURE, in the present embodiment, in order to ensure that the visible zones (the first visible zone D1 and the second visible zone D3) are symmetrically distributed about a center of the screen, an aperture ratio of the aperture on the display layer 10 is the same as an aperture ratio of the grating aperture on the liquid crystal grating layer 20. Further, an aperture position of each aperture of the display layer 10 are in one-to-one correspondence with an aperture position of the grating aperture of the liquid crystal grating layer 20. In other embodiments of the present disclosure, aperture ratios and aperture positions of the aperture of the display layer 10 and the grating aperture of the liquid crystal grating layer 20 are not limited to the above design, and can be flexibly adjusted according to the actual requirements for the visible zone.

Preferably, in the present embodiment, entire surfaces of the display layer 10 and the liquid crystal grating layer 20 are bonded together via a glass glue. In other exemplary embodiments of the present disclosure, the display layer 10 and the liquid crystal grating layer 20 may also be combined by other materials or means. In addition, a distance between the liquid crystal grating layer 20 and the display layer 10 matches parameters such as a pixel size and the aperture ratio of the display layer or the liquid crystal grating layer, and the distance between the liquid crystal grating layer 20 and the display layer 10 may be adjusted by adjusting a thickness of the glass glue.

In the present embodiment, a resolution of the liquid crystal grating layer 20 is the same as a resolution of the display layer 10 and there is no resolution loss in the anti-peep display mode, so that a visible viewing effect is not affected. Moreover, a pitch of the liquid crystal grating layer 20 is different from a pixel pitch of the display layer 10, and a length of the pitch of the display layer 10 may be calculated according to the size and resolution of different display layers 10 (the screen of the display device), and then the pitch of the liquid crystal grating layer 20 is calculated by referring to a bonding thickness and a viewing distance of the liquid crystal grating layer 20 and the display layer 10. In the anti-peep display mode, the anti-peep display device provided by the present disclosure can satisfy the switch between the anti-peep function and the shared display in one direction, while it is normally the shared display mode in a direction perpendicular thereto. For example, for a display product, a switchable angle between anti-peep display and shared display is switchable in the horizontal direction while it is normally the shared display mode in the vertical direction. In actual life, the main anti-peep direction of various display products is usually a single direction (horizontal direction or vertical direction), so that the above structure design can meet the user's requirement for the switch between the anti-peep display and the shared display.

In the present embodiment, the liquid crystal grating layer 20 further includes an electrode, which may preferably be a transparent electrode to avoid blocking light transmitted through the liquid crystal grating layer 20. The electrode is disposed at the liquid crystal layer of the liquid crystal grating layer 20 and is connected to an external circuit via a peripheral wiring. The present disclosure is capable of controlling a plurality of gratings of the liquid crystal grating layer 20 to switch between black and white by applying a voltage signal on the liquid crystal layer by the electrode. In addition, since the liquid crystal grating layer 20 only needs to be in both black and white states, the driving voltage signal applied to the electrode is a 0V signal and a Vop signal, and the signal configuration is relatively simple. Preferably, in the present embodiment, gratings of the liquid crystal grating layer 20 simultaneously change from black to white, and simultaneously change from white to black, i.e., black strips of the grating are simultaneously turned on or turned off, so that the liquid crystal grating layer 20 only needs one peripheral wiring to complete the control for the liquid crystal grating layer 20 without sequential control.

As shown in the FIGURE, in the present embodiment, the anti-peep display device further includes a backlight layer for the liquid crystal grating layer 20 to be disposed between the display layer 10 and the backlight layer. In other embodiments, the backlight layer may not be provided according to different types and functional requirements of the display device, and is not limited thereto.

Further, in the present embodiment, an implementation of the liquid crystal grating layer 20 may preferably use a TN type liquid crystal deflection mode. Accordingly, the liquid crystal grating layer 20 is in a normally white mode without power supply, and may be considered as inoperative. At this time, the anti-peep display device may be considered as a structure in which the backlight layer and the display layer 10 are bonded, which is same as a conventional display device structure and will not affect the viewing angle and viewing effect. When a voltage signal is applied to the liquid crystal layer of the liquid crystal grating layer 20 via the peripheral wiring and the electrode, the liquid crystal of part of the region is deflected, and a macroscopic representation thereof is that a corresponding region becomes black, and a black strip of the grating appears to block the backlight, so that the backlight is emitted at a specific region, and then blocked by a photomask of the display layer 10, so that the light is emitted at a specific angle in a specific region, and finally visible within a certain range, thereby realizing the anti-peep display.

Based on the above design, when the anti-peep display device provided by the present disclosure operates in the anti-peep operation mode, the liquid crystal grating layer 20 works, and a viewing angle corresponding to the visible zone and an anti-peep angle of the anti-peep zone D2 may be calculated at a viewing distance. As shown in the FIGURE, in the present embodiment, the design may satisfy that the first visible zone D1 is within a range between −30° and 30°, the anti-peep zone D2 is within a range between 30° and 70°, and a range of the second visible zone D3 greater than 70° is still visible, however, the brightness of this region is low and the viewing effect is poor. In addition, an emission angle of the backlight may be within 70° by the design of a backlight film material, so that a requirement of full angle anti-peep may be satisfied. It should be understood that angle ranges of the visible zone and the anti-peep zone D2 described above are only the angle range required in the present embodiment, and in other exemplary embodiments of the present disclosure, by adjusting aperture ratios of the liquid crystal grating layer 20 and the display layer 10, or by adjusting the placement height between the liquid crystal grating layer 20 and the display layer 10, and combining with factors such as the viewing distance, different anti-peep angles and viewing angles can be obtained to satisfy different requirements of anti-peeping display and shared display.

Embodiment of Anti-Peep Display Method

In combination with the above description of the anti-peep display device, the present disclosure also provides an anti-peep display method. An exemplary embodiment of the anti-peep display method provided by the present disclosure will be described below. In the exemplary embodiment, the anti-peep display method provided by the present disclosure is described by taking an LCD display device as an example. It will be readily understood by those skilled in the art that various modifications, additions, substitutions, deletions, or other variations are made to the specific embodiments described below in order to adapt the design of the anti-peep display method to other types of display devices. These variations are still within the scope of the principles of the anti-peep display method provided by the present disclosure.

In the present embodiment, the anti-peep display method provided by the present disclosure mainly includes the following steps of:

providing a liquid crystal grating layer including two glass substrates spaced apart and disposed opposite to each other and a liquid crystal layer sandwiched between the two glass substrates, and a resolution of the liquid crystal grating layer is the same as a resolution of the display layer;

arranging the liquid crystal grating layer at a surface of a display layer of the display device; and adjusting the liquid crystal layer to control a plurality of gratings of the liquid crystal grating layer to switch between black and white to adjustably form an anti-peep zone in a visible zone of the display device, so that the display device is controlled to switch between an anti-peep display mode and a shared display mode.

It should be noted that the above steps representatively describe the structural design and anti-peep imaging design of the anti-peep display method provided by the present disclosure. In addition to the above-mentioned general design steps, a combination of one or more of the following steps may be flexibly selected according to different requirements for the anti-peep function of the display device, and the anti-peep display method is constituted in combination with the above steps, which will not be limited thereto.

In the embodiment, the step of providing a liquid crystal grating layer may further include: designing a switch between black and white of a plurality of gratings of the liquid crystal grating layer to be simultaneously turned on or simultaneously turned off. That is to say, the plurality of gratings of the liquid crystal grating layer are simultaneously switched from black to white, and simultaneously switched from white to black. Based on the above design, the control of the plurality of gratings of the grating layer may be completed by only providing a peripheral wiring on the display device without additional sequential control.

Further, in the embodiment, the step of providing a liquid crystal grating layer may further include: designing a resolution of the liquid crystal grating layer to be the same as that of the display layer.

Further, in the embodiment, the step of providing a liquid crystal grating layer may further include: designing an aperture ratio of the liquid crystal grating layer to be the same as that of the display layer.

Further, in the embodiment, the step of providing the liquid crystal grating layer may further include: designing aperture positions of grating apertures of the liquid crystal grating layer to be in one-to-one correspondence with aperture positions of apertures of the display layer.

Furthermore, in the embodiment, the step of providing a liquid crystal grating layer may further include: calculating a pixel spacing (i.e., a pixel pitch) of the display layer according to a size and a resolution of the display layer (which may also be understood as a screen of the display device), so that, in combination with a bonding thickness of the liquid crystal grating layer and the display layer and a viewing distance of the display device (i.e., a distance between the display layer and the human eye), the pixel pitch of the liquid crystal grating layer is correspondingly calculated and configured. With this design method, in the anti-peep display mode, the display device can only satisfy the switch between the anti-peep function and the shared display in one direction, and it is normally the shared display mode in a direction perpendicular thereto. For example, for a display product, a switchable angle between anti-peep display and shared display is switchable in the horizontal direction and it is normally the shared display mode in the vertical direction. In actual life, the main anti-peep direction of various display products is usually a single direction (horizontal direction or vertical direction), so that the above structure design can meet the user's requirement for the switch between the anti-peep display and the shared display.

Further, in the embodiment, the step of providing a liquid crystal grating layer may further include: forming a liquid crystal layer of the liquid crystal grating layer by using a TN type liquid crystal deflection method. Based on the above steps, the liquid crystal layer is in the normally white mode when no power is applied, and the grating may be considered as inoperative. At this time, the display device may be regarded as an approximate bonding structure composed of the backlight layer and the display layer, and there is no significant difference between the above structure and a structure of the conventional display device, which will not affect the viewing angle and the viewing effect. When a voltage signal is applied, the liquid crystal of part of the region is deflected, and a macroscopic representation thereof is a region corresponding to each grating changes from white to black, and a black strip of the grating appears to block the backlight, so that the backlight is emitted in a specific region, and then blocked by BM of the display layer, so that the light is emitted at a specific angle in a specific region, and finally visible within a certain range, thereby realizing the anti-peep display.

Further, in the embodiment, the step of providing a liquid crystal grating layer may further include: providing an electrode at the liquid crystal layer, and connecting the electrode to an external circuit via the peripheral wiring. Accordingly, a control signal may be conducted from the external circuit to the electrode via the peripheral wiring in the form of a voltage signal and applied to the liquid crystal layer, thereby controlling the switch of the plurality of gratings of the liquid crystal grating layer between black and white.

Further, in the embodiment, the step of arranging the liquid crystal grating layer at the display layer may further include: arranging the liquid crystal grating layer at a surface of the LCD layer opposite to a backlight layer when the display layer is an LCD layer. That is to say, when the display device is an LCD display, the liquid crystal grating layer is disposed between the LCD layer and the backlight layer since the display device has an LCD layer and a backlight layer and the LCD layer is not self-luminous. Correspondingly, in other embodiments, when the display is of another type, i.e., when the display layer is of a self-luminous type, the liquid crystal grating layer is disposed at a surface of the display layer in a light-emitting direction, i.e., a surface facing the human eye.

Further, in the embodiment, the step of arranging the liquid crystal grating layer at the display layer may further include: bonding entire surfaces of the display layer and the liquid crystal grating layer by using a transparent adhesive material (for example, a glass glue).

Further, in the embodiment, the step of arranging the liquid crystal grating layer at the display layer may further include: correspondingly calculating and configuring a spacing between the liquid crystal grating layer and the display layer according to pixel sizes, aperture ratios and aperture positions of the liquid crystal grating layer and the display layer. A spacing between the liquid crystal grating layer and the display layer may be achieved by adjusting a thickness of the adhesive material therebetween.

In conclusion, the present disclosure provides an anti-peep display device and an anti-peep display method, which can realize the anti-peep function of the display device by providing a liquid crystal grating layer at a surface of the display layer, i.e., by adding only one device structure of the liquid crystal grating layer in the existing structure, so as to enable the display device to switch between the anti-peep display mode and the shared display mode, and the device has a simple structure, a thinner thickness, and a lower increase of cost.

While the invention has been described with reference to several exemplary embodiments, it should be understood that the terms used are intended to be illustrative and exemplary, rather than to be limitative. The present disclosure may be embodied in a variety of forms without departing from the spirit or scope of the invention, so it should be understood that the above-described embodiments are not limited to any of the previous details and should be widely interpreted within the spirit and scope defined by the appended claims. Therefore, all changes and modifications that fall within the scope of the claims or equivalents thereof are intended to be covered by the appended claims.

What is claimed is:

1. An anti-peep display device, wherein:
   the anti-peep display device comprises a display layer and a liquid crystal grating layer;
   the liquid crystal grating layer is disposed at a surface of the display layer;
   the liquid crystal grating layer comprises two layers of glass substrate and a liquid crystal layer;
   the two layers of glass substrate are spaced apart and oppositely disposed;
   the liquid crystal layer is sandwiched between the two layers of the glass substrate;
   wherein, by adjusting the liquid crystal layer, a plurality of gratings of the liquid crystal grating layer are controlled to switch between black and white, thereby controlling the anti-peep display device to switch between an anti-peep display mode and a shared display mode,
   an aperture ratio of the display layer is the same as an aperture ratio of the liquid crystal grating layer.

2. The anti-peep display device according to claim 1, wherein:
   the display layer is an LCD layer;
   the anti-peep display device further comprises a backlight layer; and
   the liquid crystal grating layer is disposed between the LCD layer and the backlight layer.

3. The anti-peep display device according to claim 1, wherein:
   the display layer is a self-luminous display layer; and
   the liquid crystal grating layer is disposed at a surface of the self-luminous display layer in a light-emitting direction.

4. The anti-peep display device according to claim 1, wherein:
   a resolution of the liquid crystal grating layer is the same as a resolution of the display layer.

5. The anti-peep display device according to claim 1, wherein:
   an aperture position of the display layer is in one-to-one correspondence with each aperture position of the liquid crystal grating layer.

6. The anti-peep display device according to claim 1, wherein:
   entire surfaces of the display layer and the liquid crystal grating layer are bonded via a transparent adhesive material.

7. The anti-peep display device according to claim 1, wherein:
   the liquid crystal layer of the liquid crystal grating layer uses a TN type liquid crystal deflection mode.

8. The anti-peep display device according to claim 1, wherein:
   the liquid crystal grating layer further comprises an electrode;
   the electrode is disposed at the liquid crystal layer and connected to an external circuit via a peripheral wiring;
   wherein the plurality of gratings of the liquid crystal grating layer are controlled to switch between black and white by the electrode applying a voltage signal on the liquid crystal layer.

9. The anti-peep display device according to claim 8, wherein:
   the gratings of the liquid crystal grating layer simultaneously change from black to white; and
   the gratings of the liquid crystal grating layer simultaneously change from white to black.

10. An anti-peep display method for providing an anti-peep function to a display device, wherein the anti-peep display method comprises the following steps of:
    providing a liquid crystal grating layer comprising two glass substrates spaced apart and disposed opposite to each other and a liquid crystal layer sandwiched between the two glass substrates;
    arranging the liquid crystal grating layer at a surface of a display layer of the display device; and
    adjusting the liquid crystal layer to control a plurality of gratings of the liquid crystal grating layer to switch between black and white to adjustably form an anti-peep zone in a visible zone of the display device, so that the display device is controlled to switch between an anti-peep display mode and a shared display mode,
    wherein the step of providing a liquid crystal grating layer further comprises: designing an aperture ratio of the liquid crystal grating layer to be the same as an aperture ratio of the display layer.

11. The anti-peep display method according to claim 10, wherein:
    the step of providing a liquid crystal grating layer further comprises: designing a switch between black and white of a plurality of gratings of the liquid crystal grating layer to that the plurality of gratings of the liquid crystal grating layer are simultaneously switched from black to white, and simultaneously switched from white to black.

12. The anti-peep display method according to claim 10, wherein: the step of providing a liquid crystal grating layer further comprises: designing a resolution of the liquid crystal grating layer to be the same as a resolution of the display layer.

13. The anti-peep display method according to claim 10, wherein: the step of providing the liquid crystal grating layer further comprises: designing aperture positions of grating apertures of the liquid crystal grating layer to be in one-to-one correspondence with aperture positions of apertures of the display layer.

14. The anti-peep display method according to claim 10, wherein: the step of providing a liquid crystal grating layer further comprises: forming a liquid crystal layer of the liquid crystal grating layer by using a TN type liquid crystal deflection method.

15. The anti-peep display method according to claim 10, wherein: the step of providing a liquid crystal grating layer further comprises: providing an electrode at the liquid crystal layer, and connecting the electrode to an external circuit via a peripheral wiring.

16. The anti-peep display method according to claim 10, wherein: the step of arranging the liquid crystal grating layer at the display layer further comprises: when the display device is an LCD layer, the anti-peep display device further comprises a backlight layer, and the liquid crystal grating layer is disposed between the LCD layer and the backlight layer.

17. The anti-peep display method according to claim 10, wherein: the step of arranging the liquid crystal grating layer at the display layer further comprises: when the display device is a self-luminous display layer, the liquid crystal grating layer is disposed at a surface of the self-luminous display layer in a light-emitting direction.

18. The anti-peep display method according to claim 10, wherein: the step of arranging the liquid crystal grating layer at the display layer further comprises: bonding entire surfaces of the display layer and the liquid crystal grating layer by using a transparent adhesive material.

* * * * *